United States Patent
Tanner et al.

(10) Patent No.: US 8,360,097 B2
(45) Date of Patent: Jan. 29, 2013

(54) VALVE ACTUATOR AND THROTTLE VALVE ASSEMBLY EMPLOYING THE SAME

(75) Inventors: Justin A. Tanner, Queen Creek, AZ (US); Larry Blessing, Mesa, AZ (US); Doug Kortum, Mesa, AZ (US); Benjamin Tang, San Gabriel, CA (US)

(73) Assignee: Honeywell International Inc., Morristown, NJ (US)

( * ) Notice: Subject to any disclaimer, the term of this patent is extended or adjusted under 35 U.S.C. 154(b) by 1473 days.

(21) Appl. No.: 12/107,455

(22) Filed: Apr. 22, 2008

(65) Prior Publication Data

US 2009/0261279 A1    Oct. 22, 2009

(51) Int. Cl.
| | |
|---|---|
| F16K 31/124 | (2006.01) |
| F16K 31/363 | (2006.01) |
| F16K 31/383 | (2006.01) |
| F15B 11/10 | (2006.01) |
| F15B 11/15 | (2006.01) |
| F15B 13/042 | (2006.01) |
| F15B 13/044 | (2006.01) |
| F02K 7/08 | (2006.01) |
| F02K 7/10 | (2006.01) |

(52) U.S. Cl. ............. 137/492.5; 91/422; 91/49; 60/767
(58) Field of Classification Search .................. 137/488, 137/486, 504, 492.5; 91/422, 431, 49; 60/767, 60/768
See application file for complete search history.

(56) References Cited

U.S. PATENT DOCUMENTS

| | | | | |
|---|---|---|---|---|
| 1,812,577 | A | * | 6/1931 | Herman ........................... 60/468 |
| 2,375,204 | A | * | 5/1945 | Baker ................................ 91/49 |
| 2,729,228 | A | * | 1/1956 | Stevenson ...................... 137/199 |
| 2,758,811 | A | | 8/1956 | Peterson |
| 2,884,003 | A | * | 4/1959 | Jensen ........................... 137/495 |
| 2,940,427 | A | * | 6/1960 | Mueller ............................ 91/33 |
| 3,279,496 | A | * | 10/1966 | Klass et al. ................. 137/487.5 |
| 3,435,844 | A | | 4/1969 | Stelzer |
| 3,472,480 | A | | 10/1969 | Williams |
| 3,543,682 | A | * | 12/1970 | Frederick ....................... 101/366 |
| 3,823,734 | A | * | 7/1974 | McJones ....................... 137/498 |
| 4,179,980 | A | * | 12/1979 | Kito et al. ........................... 91/6 |
| 4,309,022 | A | | 1/1982 | Reinicke et al. |
| 4,331,179 | A | | 5/1982 | Gray |
| 4,617,958 | A | * | 10/1986 | Seidel et al. ............... 137/492.5 |
| 4,633,665 | A | * | 1/1987 | Buter et al. ..................... 60/413 |
| 4,671,318 | A | * | 6/1987 | Benson ......................... 137/486 |
| 4,789,131 | A | | 12/1988 | Vork |
| 4,895,341 | A | | 1/1990 | Brown et al. |
| 4,967,791 | A | | 11/1990 | Sternberger |
| 5,044,394 | A | * | 9/1991 | Brombach ................... 137/486 |
| 5,848,779 | A | | 12/1998 | Murbe et al. |

(Continued)

*Primary Examiner* — John Rivell
*Assistant Examiner* — Jonathan Waddy
(74) *Attorney, Agent, or Firm* — Ingrassia Fisher & Lorenz, P.C.

(57) ABSTRACT

Embodiments of a valve actuator are provided for adjusting the position of a main valve element in relation to the pressure of a fluid supplied by a supply duct. The valve actuator includes a housing, a control pressure valve disposed in the housing, and a piston slidably disposed in the housing and mechanically coupled to the main valve element. The housing has a control pressure chamber therein, which is configured to be fluidly coupled to the supply duct. The control pressure valve is configured to substantially impede fluid flow into the control pressure chamber until the fluid pressure within the supply duct surpasses a minimum actuation pressure. The piston normally resides in a first position and is configured to move toward a second position as the pressure within the control pressure chamber increases.

20 Claims, 5 Drawing Sheets

U.S. PATENT DOCUMENTS

| | | |
|---|---|---|
| 5,924,671 A | 7/1999 | Baumann |
| 5,931,186 A * | 8/1999 | Skoglund ............... 137/486 |
| 6,041,804 A * | 3/2000 | Chatufale .............. 137/15.23 |
| 6,517,050 B1 | 2/2003 | Pabst |
| 6,694,746 B2 * | 2/2004 | Reed et al. ............... 60/787 |
| 6,808,158 B2 | 10/2004 | Schwarz |
| 6,991,211 B2 | 1/2006 | Altonji |
| 7,309,027 B2 | 12/2007 | Magel et al. |
| 2006/0243937 A1 | 11/2006 | Hoang |
| 2008/0001108 A1 | 1/2008 | Abel et al. |

* cited by examiner

VALVE ACTUATOR AND THROTTLE VALVE ASSEMBLY EMPLOYING THE SAME

TECHNICAL FIELD

The present invention relates generally to a valve actuator and, more particularly, to a fluidly-controlled valve actuator suitable for deployment within, for example, a throttle valve assembly.

BACKGROUND

Valve actuators are commonly employed to continually adjust the position of a main valve element (e.g., a butterfly valve plate) disposed within a main flow conduit and thereby control pressurized fluid flow therethrough. A generalized valve actuator may comprise, for example, a piston slidably mounted within a valve housing. A valve linkage mechanically couples the piston to the valve element, and an actuator spring biases the piston toward a retracted position. An actuator chamber is provided in the valve housing and fluidly coupled to a variable-pressure fluid source (e.g., a section of the main flow conduit located downstream of the valve element). As the fluid pressure within the main flow conduit increases, so to does the fluid pressure within the actuator chamber. The fluid within the actuator chamber acts on an exposed area of the piston in opposition to the bias force of the piston spring. When the pressure of the fluid within the actuation chamber exceeds a minimum actuation pressure, the piston moves toward an extended position and the main valve element closes.

In valve actuators of the type described above, it is commonly desirable that the valve actuator be configured such that the minimum actuation pressure is relatively high (e.g., approximately 500 pounds per square inch or more). The minimum actuation pressure is generally determined by the exposed area of the piston and the preload of the piston spring. At the same time, it may be desirable that piston movement occur over a relatively narrow pressure range in a controlled and accurate manner. The valve actuator's piston position-to-pressure characteristic is largely determined by the exposed area of the piston and by the spring rate of the piston spring. Unfortunately, in a conventional valve actuator, the actuator spring may not be capable of providing both the desired spring rate and the preload required to achieve a significant minimum actuation pressure.

Considering the above, it should be appreciated that it would be desirable to provide a valve actuator that may be calibrated to a relatively high minimum actuation pressure and that is capable of providing a significant piston displacement over a relatively narrow pressure range. Preferably, such a valve actuator would be relatively compact and lightweight and, consequently, well-suited for use aboard aircraft. In addition, it would be desirable to provide a throttle valve assembly employing such a compact and lightweight valve actuator. Other desirable features and characteristics of the present invention will become apparent from the subsequent Detailed Description and the appended claims, taken in conjunction with the accompanying drawings and this Background.

BRIEF SUMMARY

Embodiments of a valve actuator are provided for adjusting the position of a main valve element in relation to the pressure of a fluid supplied by a supply duct. The valve actuator includes a housing, a control pressure valve disposed in the housing, and a piston slidably disposed in the housing and mechanically coupled to the main valve element. The housing has a control pressure chamber therein, which is configured to be fluidly coupled to the supply duct. The control pressure valve is configured to substantially impede fluid flow into the control pressure chamber until the fluid pressure within the supply duct surpasses a minimum actuation pressure. The piston normally resides in a first position and is configured to move toward a second position as the pressure within the control pressure chamber increases.

In another embodiment, a throttle valve assembly is provided for use in conjunction with a supply duct fluidly coupled to a variable-pressure fluid source. The throttle valve assembly includes a flowbody having a main flow conduit extending therethrough, a valve element disposed within the main flow conduit and movable between an open position and a closed position, and a valve actuator coupled to the flowbody. The valve actuator includes a housing having a control pressure chamber therein, a control pressure valve disposed in the housing, and a piston slidably disposed in the housing and mechanically coupled to the main valve element. The control pressure chamber is configured to be fluidly coupled to the supply duct, and the control pressure valve is configured to substantially impede fluid flow into control pressure chamber until the pressure of the fluid within the supply duct surpasses a minimum actuation pressure. The piston normally resides in a retracted position and is configured to move toward an extended position as the pressure within the control pressure chamber increases.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
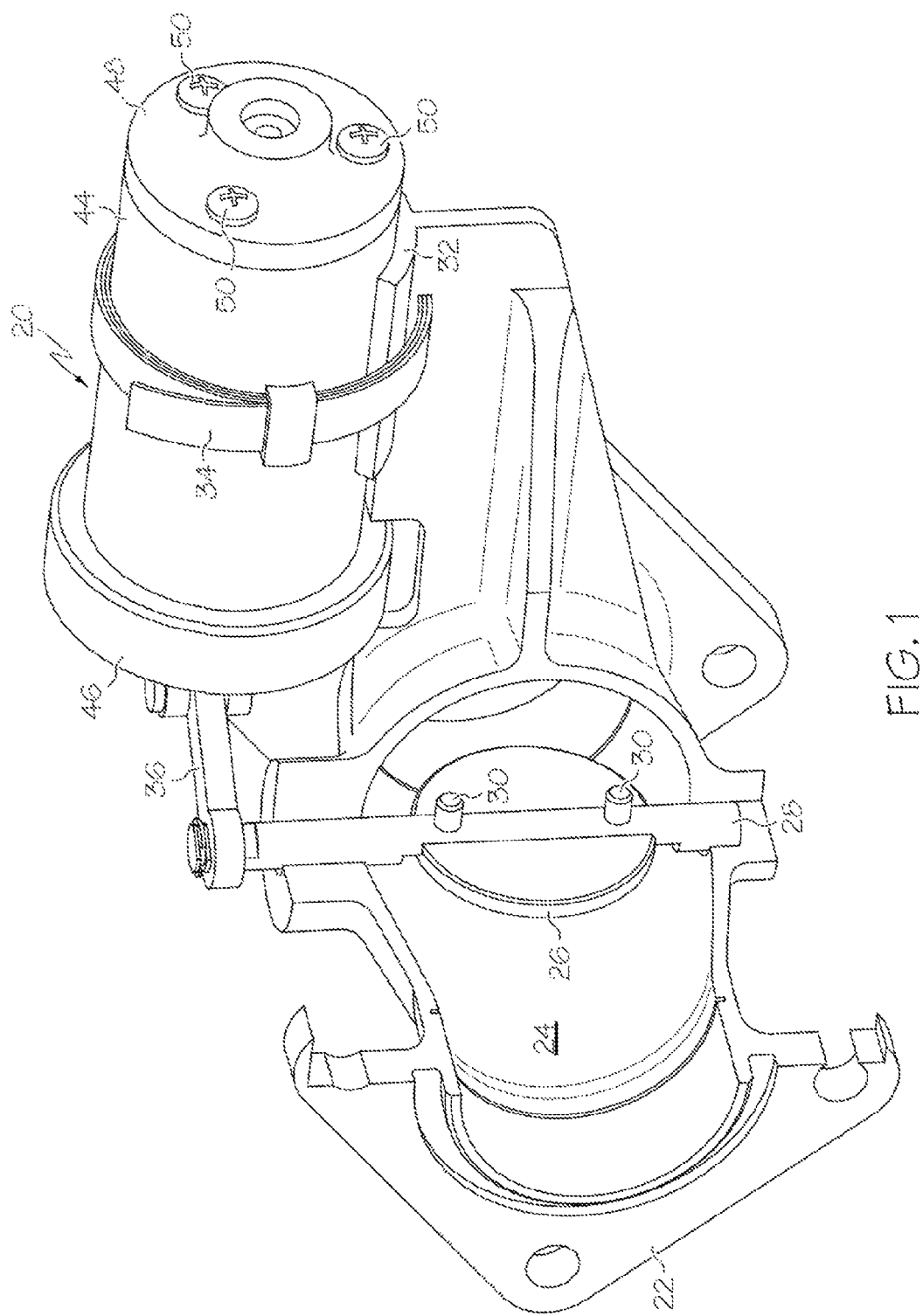
FIGS. 1 and 2 are isometric cutaway and cross-sectional views, respectively, of a valve actuator in accordance with an exemplary embodiment.

FIG. 1 is an isometric view of a fluidly-controlled valve actuator 20 in accordance with an exemplary embodiment. Valve actuator 20 is suitable for use in conjunction with a wide variety of hydraulic and pneumatic devices. As a non-limiting example, FIG. 1 illustrates valve actuator 20 in conjunction with a flowbody 22 (partially shown in cutaway) having a main flow conduit 24 extending therethrough. A valve element, in this case a butterfly valve plate 26, is rotatably mounted within main flow conduit 24. More specifically, butterfly valve plate 26 is fixedly coupled to a rotatable shaft 28 by way of first and second fasteners 30. Valve actuator 20 is fixedly mounted to a mounting interface 32 (e.g., a cradle) provided on flowbody 22 utilizing, for example, a band clamp 34. Valve actuator 20 includes a piston (hidden from view in FIG. 1) that is mechanically coupled to rotatable shaft 28, and thus to butterfly valve plate 26, by way of a floating valve linkage 36. Valve actuator 20 may move butterfly valve plate 26 between an open position (shown in FIG. 1), a closed position, and various intermediate positions. Notably, in the illustrated exemplary embodiment, the outer diameter of butterfly valve plate 26 is substantially smaller than the inner diameter of main flow conduit 24. Consequently, when butterfly valve plate 26 is in a closed position, a clearance is provided between the outer peripheral edge of plate 26 and an inner surface of main flow conduit 24. As a result, butterfly valve plate 26 permits a reduced fluid flow through main flow conduit 24 when in a closed position. In alternative embodiments, butterfly valve plate 26 (or a component associated therewith, such as a wiper seal) may sealingly engage an inner surface of main flow conduit 24 such that little to no fluid flow is permitted through main flow conduit 24 when plate 26 is in the closed position.

Figure 2:
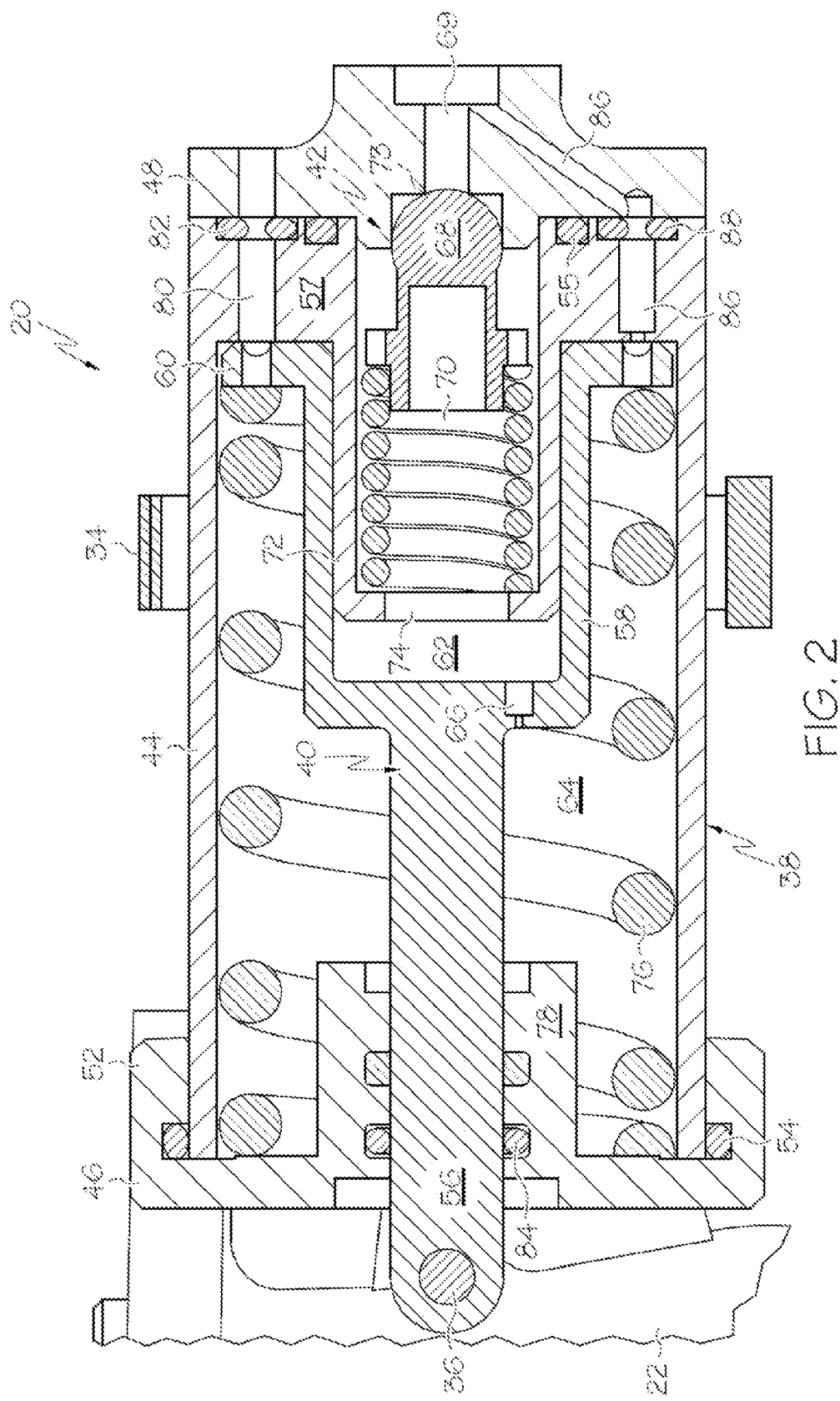

FIG. 2 is a cross-sectional view of exemplary valve actuator 20. In this view, it can be seen that valve actuator 20 comprises a valve housing 38, a translatable piston 40 disposed within valve housing 38, and a control pressure valve 42 also disposed within valve housing 38. Valve housing 38, in turn, comprises a main housing body 44, a first end cap 46, and a second end cap 48. First end cap 46 may be threadably coupled to a first end of main housing body 44, and second end cap 48 may be fixedly coupled to an opposing end of main housing body 44 utilizing, for example, a plurality of screws 50 (shown in FIG. 1) or other such fasteners. In the exemplary embodiment illustrated in FIG. 2, first end cap 46 includes an annular rim 52 that matingly engages an outer surface of main housing body 44. If desired, at least one static seal 54 may be disposed between annular rim 52 and main housing body 44 to minimize fluid leakage. Similarly, at least one static seal 55 may be disposed between end cap 48 and an end wall 57 of main housing body 44.

Piston 40 is mounted within a central bore of main housing body 44 and includes first and second opposing end portions 56 and 58. End portion 56 may assume the form of an elongated rod that extends through an aperture provided through end cap 46. As indicated above, end portion 56 is mechanically coupled to butterfly valve plate 26 (FIG. 1) by way of floating valve linkage 36. A cavity is provided in end portion 58, and a flange 60 is circumferentially disposed around end portion 58. End portion 58 of piston 40 cooperates with main housing body 44 to define two chambers within valve housing 38, namely, a control pressure chamber 62 and a return pressure chamber 64. Control pressure chamber 62 is fluidly coupled to return pressure chamber 64 by way of a control orifice 66. In addition, chambers 62 and 64 may be fluidly coupled via a clearance provided between the peripheral edge of flange 60 and an inner surface of main housing body 44 as described more fully below. In the exemplary embodiment shown in FIG. 2, control orifice 66 is formed through end portion 58 of piston 40; however, in alternative embodiments, control orifice 66 may be formed through a different portion of piston 40 or, instead, through a sidewall of main housing body 44.

Referring still to FIG. 2, an inlet 69 is provided through end cap 48. During operation of valve actuator 20, control pressure valve 42 selectively impedes flow through inlet 69. Control pressure valve 42 may comprise any valve suitable for performing this function, including, for example, a spool valve. In the illustrated exemplary embodiment, control pressure valve 42 assumes the form of a poppet valve that includes a poppet valve element 68 (e.g., a spherical stopper) and poppet valve spring 70. Poppet valve element 68 and poppet valve spring 70, and like structural elements, may also be referred to herein generically as a "control pressure valve element" and a "control pressure valve spring," respectively. An inner structure 72, which may be integrally formed with main housing body 44 and which extends outwardly from end wall 57, houses poppet valve element 68 and poppet valve spring 70. When piston 40 resides in the retracted position (shown in FIG. 2), inner structure 72 is received by the cavity provided within end portion 58; e.g., the outer diameter of inner structure 72 may be substantially equivalent to (e.g., slightly smaller than) the inner diameter of the cavity in end portion 58. By nesting inner structure 72 and control pressure valve 42 within piston 40 in this manner, the envelope of valve actuator 20 is minimized.

Poppet valve element 68 is movable between a closed position (shown in FIG. 1), an open position, and various intermediate positions. In the closed position (FIG. 1), poppet valve element 68 contacts a seating surface 73 provided on end cap 48 so as to substantially prevent fluid flow through inlet 69 and into control pressure chamber 62. Poppet valve spring 70 normally maintains poppet valve element 68 in the closed position. However, when the pressure exerted on poppet valve element 68 by the fluid at inlet 69 exceeds a minimum actuation pressure, poppet valve element 68 lifts from seating surface 73 and moves toward the open position. Fluid is consequently permitted to flow through inlet 69 and into inner structure 72 of main housing body 44. An opening 74 is provided through inner structure 72 to permit the pressurized fluid to flow from inlet 69, through inner structure 72, and into control pressure chamber 62.

Piston 40 is movable between a retracted position (shown in FIG. 2), an extended position, and various intermediate positions. In the illustrated exemplary embodiment, the retracted and extended positions of piston 40 correspond to the open and closed positions of butterfly valve plate 26 (FIG. 1), respectively. A piston spring 76 is disposed within valve housing 38 and biases piston 40 toward the retracted position. Piston spring 76 may be, for example, compressed between flange 60 and an inner surface of end cap 46. Piston spring 76 normally maintains piston 40 in the retracted position. However, when the force exerted on piston 40 by the pressurized fluid within control pressure chamber 62 exceeds the bias force of piston spring 76, piston 40 moves toward the extended position (to the left in FIG. 2) and butterfly valve plate 26 (FIG. 1) rotates toward a closed position. If desired, the stroke of piston 40 (and thus the rotation of butterfly valve plate 26) may be limited by a stop feature 78 incorporated into valve housing 38 (e.g., into end cap 46).

The translational position of piston 40 is generally determined by the fluid pressure within control pressure chamber 62, the effected areas of piston 40, and the spring rate of piston spring 76. By selecting the appropriate spring rate for piston spring 76, the translational position of piston 40, and thus the rotational position of butterfly valve plate 26 (FIG. 1), can be precisely calibrated over a predetermined pressure range, even if the pressure range is relatively narrow. Notably, in applications wherein it is desired for piston 40 to first move toward the extended position at a relatively high minimum actuation pressure, piston spring 76 need not be selected to exert a particularly high preload on piston 40; instead, poppet valve spring 70 may be chosen to exert the desired preload on poppet valve element 68. As a result, piston spring 76 need only be chosen to provide the desired spring rate. Consequently, valve actuator 20 may readily be calibrated to provide both a high minimum actuation pressure and a piston position-to-pressure characteristic having a relatively steep slope (i.e., an improved gain characteristic). Additionally, the size of poppet valve spring 70 and/or piston spring 76 may be minimized thus permitting the overall dimensions and weight of valve actuator 20 to be further reduced. Although not shown in FIG. 2, it will be appreciated that one or more preload adjustments means (e.g., a shim stack, a threaded member, etc.) may be disposed within valve housing 38 between end cap 46 and piston spring 76 and/or between a wall of inner structure 72 and poppet valve spring 70 to permit the preload of spring 76 and/or spring 70 to be manually adjusted.

Control orifice 66 permits fluid flow from control pressure chamber 62 to return pressure chamber 64 at a defined rate. As noted above, a clearance may also be provided between the outer peripheral edge of flange 60 and an inner surface of main housing body 44 to further permit controlled fluid flow from chamber 62 to chamber 64. Such a clearance may also help to minimize friction and to prevent the formation of a low pressure region between flange 60 and end wall 57 of main housing body 44 as piston 40 extends. Also, to further help prevent the formation of such a low pressure region, one or more apertures may be formed through flange 60; e.g., flange 60 may be castellated. Finally, an outlet 80 is formed through flange 60 and valve housing 38, specifically through main housing body 44 and end cap 48, to permit pressurized fluid to flow out of return pressure chamber 64.

To prevent leakage of the fluid contained within return pressure chamber 64, at least one dynamic shaft seal 84 is disposed within end cap 46 and sealingly engages an outer surface of piston 40. In many applications, inlet 69 may be supplied with a fluid at a relatively high pressure. When control pressure valve 42 is in the open position, the pressure within control pressure chamber 62 may be correspondingly high. Fluid flow between control pressure chamber 62 and return pressure chamber 64 is, however, restricted by the dimensions of control orifice 66 (and by any clearance between the outer peripheral edge of flange 60 and the inner surface of main housing body 44). As a result, the pressure within return pressure chamber 64 is reduced relative to the pressure within control pressure chamber 62. This allows a low pressure seal (e.g., a seal suitable for use in applications characterized by maximum pressures of approximately 100 pounds per square inch) to be utilized as dynamic shaft seal 84, which further decreases the likelihood of fluid leakage and minimizes friction between seal 84 and translating piston 40.

In certain applications, the fluid within return pressure chamber 64 may be heated by a nearby heat source; e.g., pressurized air flowing through main flow conduit 24 (FIG. 1). In addition, the fluid supplied to inlet 69 by a supply duct (not shown in FIGS. 1 and 2) may be relatively cool. In this case, valve actuator 20 may be provided with a cooling flow passage that diverts a small portion of the fluid flowing through the supply duct to return pressure chamber 64. For example, and as shown in FIG. 2, a cooling flow passage 86 may be provided through end cap 48, end wall 57 of main housing body 44, and flange 60. As was the case previously, a seal (e.g., an o-ring) 88 may be disposed between end cap 48 and end wall 57 of main housing body 44 to help prevent leakage.

There has thus been described an exemplary embodiment of a fluidly-controlled valve actuator that is capable of achieving significant piston displacement over a relatively limited pressure range and that may be calibrated to a relatively high minimum actuation pressure. Advantageously, the above-described exemplary valve actuator is relatively compact and lightweight and, thus, well-suited for use aboard aircraft. As previously noted, embodiments of the valve actuator may be employed in wide variety of hydraulic and pneumatic systems. In one preferred group of embodiments, actuator valve 20 is deployed within a throttling valve system of the type described below in conjunction with FIGS. 3 and 4.

Figure 3:
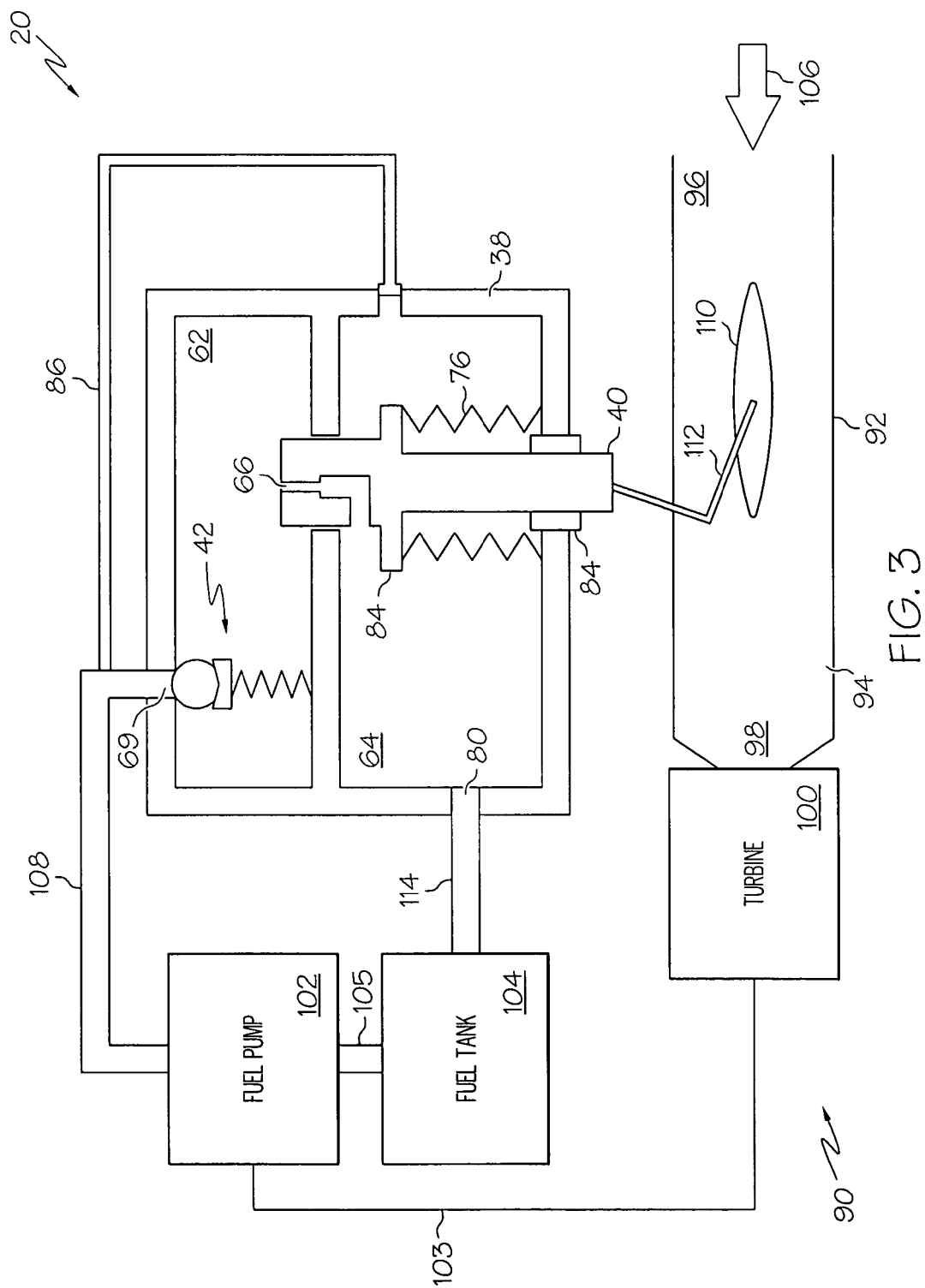
FIGS. 3 and 4 are functional schematics of an exemplary throttling system employing the valve actuator shown in FIGS. 1 and 2.
Figure 4:
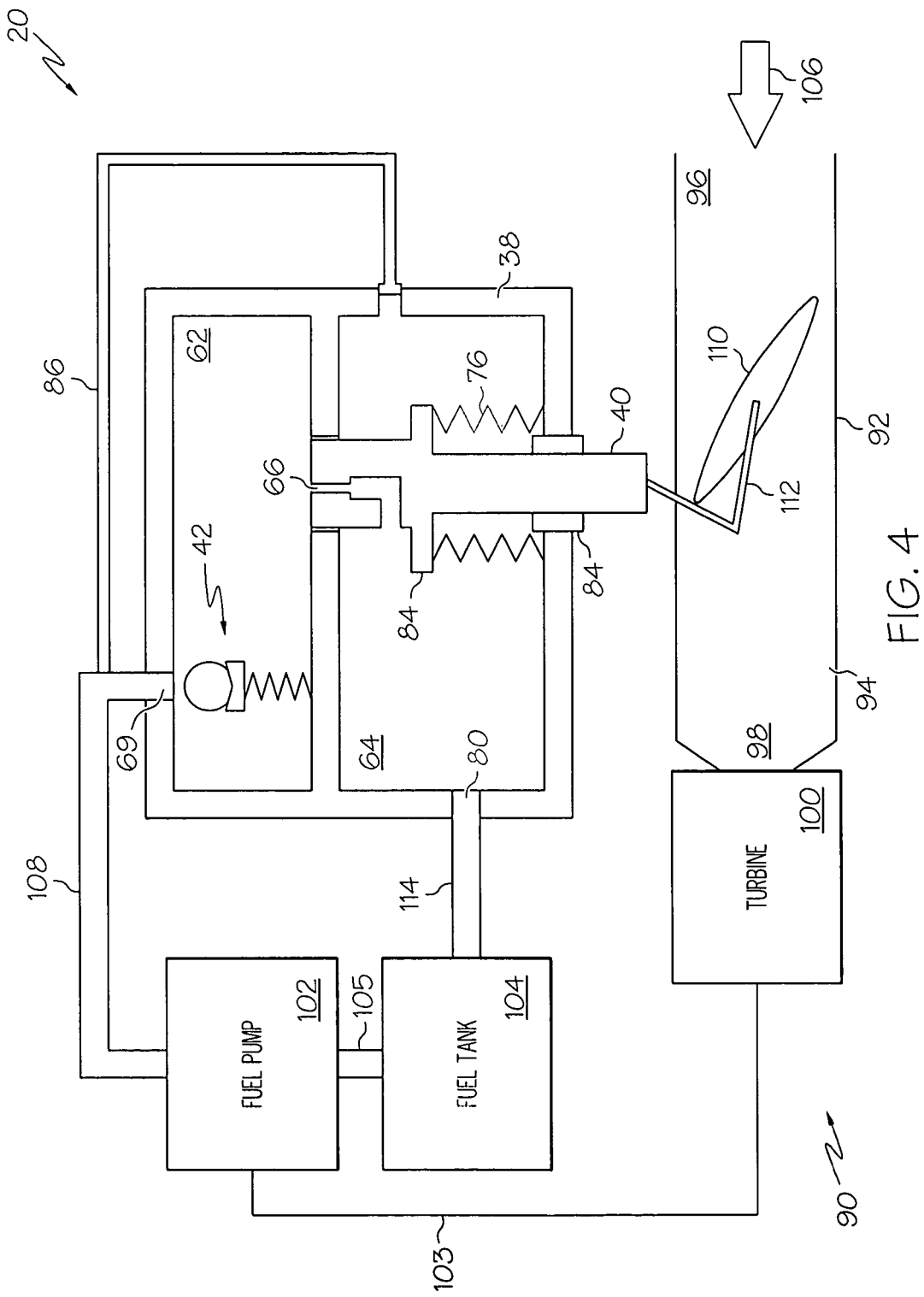

FIGS. 3 and 4 are functional schematics illustrating valve actuator 20 deployed within an exemplary throttle valve assembly 90 suitable for use aboard an aircraft, such as a supersonic missile. In this example, throttle valve assembly 90 comprises a ram jet flowbody 92 through which a main flow conduit 94 extends. Main flow conduit 94 includes an inlet 96 and an outlet 98, which is fluidly coupled to a turbine 100. A connection 103 operatively couples turbine 100 to a fuel pump 102, which functions as a variable-pressure fluid source. A duct 105 fluidly couples fuel pump 102 to a fuel tank 104. During operation of throttle valve assembly 90, pressurized air is provided to inlet 96 of flow conduit 94 (represented in FIGS. 3 and 4 by arrow 106). Flow conduit 94 directs this pressurized air into turbine 100. The pressurized air drives turbine 100, which subsequently drives fuel pump 102. When driven in this manner, fuel pump 102 draws fuel from fuel tank 104 and supplies pressurized fuel to an aircraft engine (not shown). A supply duct 108 is fluidly coupled to fuel pump 102 and diverts a portion of the pressurized fuel to inlet 69 of valve actuator 20.

It is desirable to control the pressure at which fuel pump 102 supplies fuel to the aircraft engine (not shown). The pressure at which fuel pump 102 supplies fuel to the aircraft engine is dependent upon the rotational rate of turbine 100, which is, in turn, dependent upon fluid pressure at outlet 98 of main flow conduit 94. The fluid pressure at inlet 96 is generally determined by the speed at which the aircraft is traveling and is consequently not directly controllable. Therefore, to regulate the fluid pressure at outlet 98, a butterfly valve plate 110 (or other such valve element) is disposed within main flow conduit 94. Piston 40 of valve actuator 20 is mechanically coupled to butterfly valve element 110 via a valve linkage 112. During operation, valve actuator 20 functions as a servomechanism that adjusts the translational position of piston 40, and thus the rotational position of butterfly valve plate 110, as a function of fuel pressure at inlet 69 as described more fully below.

With reference to FIG. 3, control pressure valve 42 resides in a closed position when the fluid pressure at outlet 98 is below a threshold pressure. At the same time, piston 40 and butterfly valve plate 110 reside in retracted and open positions, respectively. When the fluid pressure at outlet 98 increases, so too does the pressure output of fuel pump 102 and, therefore, the fluid pressure at inlet 69 of valve actuator 20. When the fluid pressure at inlet 69 increases above the predetermined actuation pressure, control pressure valve 42 moves into an open position. With reference to FIG. 4, when control pressure valve 42 is the open position, pressurized fuel is permitted to flow into control pressure chamber 62 and act on the exposed area of piston 40 in opposition to the bias force of piston spring 76. As the pressure within control pressure chamber 62 increases, piston 40 moves toward the retracted position (FIG. 4) and piston spring 76 is further compressed between flange 60 and an inner surface of valve housing 38. As piston 40 extends, butterfly valve plate 110 moves toward a closed position thereby impeding fluid flow through main flow conduit 94. This results in a drop in fluid pressure at inlet 98, a decrease in the rotational rate of turbine 100, and a corresponding decrease in the pressure of the fuel output by fuel pump 102. In this manner, valve actuator 20 maintains the pressure output of fuel pump 102 below a predetermined threshold value. As indicated in FIG. 4, butterfly valve plate 110 may still permit airflow through conduit 94 in the closed position to prevent fuel pump 102 from becoming inactive.

Referring still to FIG. 4, pressurized fluid flows from control pressure chamber 62, through control orifice 66, and into return pressure chamber 64. As was the case previously, an outlet 80 is provided through valve housing 38 to permit fluid to exit return pressure chamber 64. As illustrated in FIG. 4, a return duct 114 maybe fluidly coupled between outlet 80 and fuel tank 104. Thus, during operation of throttle valve assembly 90, return duct 114 directs the fuel flowing through outlet 80 back to fuel tank 104. As alluded to above, the fuel within return pressure chamber 64 may be heated by the pressurized air flowing through flowbody 92. A cooling flow passage 86 may be provided to divert a small portion of the relatively cool fuel provided by supply duct 108 into return pressure chamber 64 and thereby cool the fuel within chamber 64.

Figure 5:
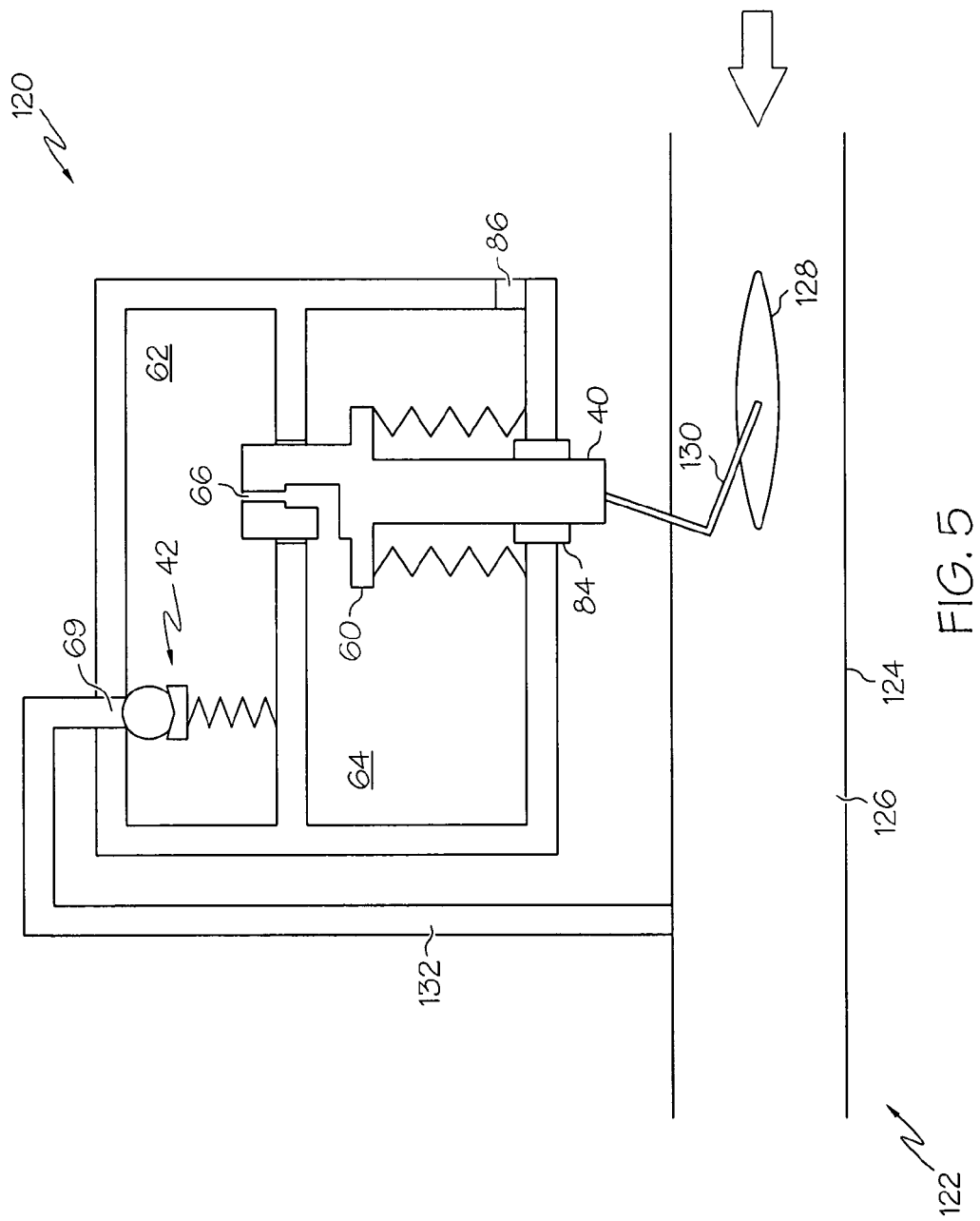
FIG. 5 is a functional schematic of an exemplary flow regulating system employing a valve actuator in accordance with another exemplary embodiment.

The foregoing has thus described an embodiment of the valve actuator in the context of an exemplary throttle valve assembly. Of course, embodiments of the actuator valve may be utilized in conjunction with other types of valve assemblies, which may conduct fluids other than pressurized fuel and/or air. To further emphasize this point, FIG. 5 illustrates a valve actuator 120 deployed within a flow regulation system 122 in accordance with a further exemplary embodiment. Valve actuator 120 is similar to valve actuator 20 described above in conjunction with FIGS. 1-4 and will thus not be described in detail herein (similar structural elements have been labeled accordingly). However, it will be appreciated that valve actuator 120 is not identical to valve actuator 20; for example, in contrast to valve actuator 20, valve actuator 120 is not provided with a cooling flow passage.

With reference to FIG. 5, flow regulation system 122 includes a flowbody 124 having a main flow conduit 126 therethrough. As was the case previously, a butterfly valve plate 128 is disposed within main flow conduit 126 and mechanically coupled to piston 40 of valve actuator 120 via a valve linkage 130. Downstream of butterfly valve plate 128, a supply duct 132 fluidly couples main flow conduit 126 to inlet 69 of valve actuator 120. In this example, outlet 80 of valve actuator 120 is vented to a low pressure source, such as an ambient pressure source. When the pressure within main flow conduit 126 downstream of butterfly valve plate 128 is below a predetermined pressure threshold, control pressure valve 42 resides in a closed position, piston 40 resides in a retracted position, and butterfly valve plate 128 resides in an open position. However, when the pressure within main flow conduit 126 downstream of butterfly valve plate 128 surpasses the predetermined threshold, control pressure valve 42 moves into an open position and the pressure within control pressure chamber 62 increases. As the force exerted on piston 40 by the fluid within control pressure chamber 62 gradually exceeds the bias force of piston spring 76, piston 40 extends and butterfly valve plate 128 closes. In this manner, valve actuator 120 maintains the pressure downstream of plate 128 below a predetermined threshold value.

In view of the above, there has been provided multiple exemplary embodiments of a valve actuator that may be calibrated to a relatively high minimum actuation pressure and that is capable of providing a significant piston displacement over a relatively narrow pressure range. There has also been provided multiple exemplary embodiments of systems (e.g., a throttle valve assembly) employing such a valve actuator. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A valve actuator for adjusting the position of a main valve element in relation to the pressure of a fluid supplied by a supply duct, the valve actuator comprising:
   a housing, comprising:
     an end wall;
     an inner structure fixedly coupled to the end wall and extending inwardly therefrom;
     an inlet configured to be fluidly coupled to the supply duct; and
     a control pressure chamber fluidly coupled to the inlet through the inner structure;
   a control pressure valve disposed in the inner structure of the housing and configured to substantially impede fluid flow into control pressure chamber until the pressure of the fluid within the supply duct surpasses a minimum actuation pressure;
   a piston slidably disposed in the housing and configured to be mechanically coupled to the main valve element, the piston normally residing in a first position and configured to move toward a second position as the pressure within the control pressure chamber increases, the piston having a cavity in which the inner structure and control pressure valve are received when the piston is in the first position; and
   a piston spring disposed in the housing and biasing the piston toward the first Position, the pressurized fluid directed into the control pressure chamber through the control pressure valve exerting a cumulative force on the piston urging the piston toward the second position in opposition to the piston spring.

2. A valve actuator according to claim 1 further comprising:
   a return pressure chamber disposed in the housing; and
   a control orifice fluidly coupling the return pressure chamber to the control pressure chamber.

3. A valve actuator according to claim 2 wherein the control orifice is formed through the piston.

4. A valve actuator according to claim 2 wherein the return pressure chamber and the control pressure chamber are defined by the piston and by the housing.

5. A valve actuator according to claim 1 wherein the piston comprises:
   a first end portion extending through the valve housing and configured to be mechanically coupled to the main valve element;
   a second end portion; and
   a flange coupled to the second end portion.

6. A valve actuator according to claim 5 wherein the piston spring is compressed between an inner surface of the housing and the flange.

7. A valve actuator according to claim 1 wherein the control pressure valve comprises:
   a poppet valve element movable between an open position and a closed position; and
   a poppet valve spring biasing the poppet valve element toward the closed position.

8. A valve actuator according to claim 2 further comprising a cooling flow passage fluidly coupled to the return pressure chamber and configured to be fluidly coupled to the supply duct.

9. A valve actuator according to claim 8 wherein the cooling flow passage is formed through the housing and through the piston.

10. A valve actuator according to claim 1 wherein the inlet is formed through the end wall, and wherein the housing further comprises a seating surface provided on the end wall and contacted by the control pressure valve when in the closed position.

11. A valve actuator according to claim 1 wherein at least a portion of the control pressure chamber is located within the cavity of the piston.

12. A throttle valve assembly for use in conjunction with a supply duct fluidly coupled to a fuel pump, which draws fuel from a fuel tank when driven by an air turbine, the throttle valve assembly comprising:
    a ram jet flowbody having a main flow conduit extending therethrough configured to be fluidly coupled to the air turbine;
    a valve element disposed within the main flow conduit and movable between an open position and a closed position; and
    a valve actuator coupled to the ram jet flowbody, the valve actuator comprising:
        a housing having a control pressure chamber therein, the control pressure chamber configured to be fluidly coupled to the fuel pump by the supply duct;
        a control pressure valve disposed in the housing and configured to substantially impede fluid flow into the control pressure chamber until the pressure of the fluid at the outlet of the fuel pump surpasses a minimum actuation pressure;
        a return pressure chamber fluidly coupled to the control pressure valve;
        a return duct fluidly coupled to the return pressure chamber and configured to be fluidly coupled to the fuel tank; and
        a piston slidably disposed in the housing and mechanically coupled to the main valve element, the piston normally residing in a retracted position and configured to move toward an extended position as the pressure within the control pressure chamber increases.

13. A throttle valve assembly according to claim 12 wherein the open position and the closed position of the valve element correspond to the retracted position and the extended position of the piston, respectively.

14. A throttle valve assembly according to claim 12 wherein the supply duct fluidly couples the fuel pump to the control pressure chamber, and wherein the throttle valve assembly further comprises a cooling flow passage fluidly coupling the supply duct to the return pressure chamber and bypassing the control pressure chamber.

15. A flow regulation system, comprising:
    a flowbody having a main flow conduit extending therethrough;
    a valve element disposed within the main flow conduit and movable between an open position and a closed position;
    a valve actuator coupled to the flowbody, the valve actuator comprising:
        a housing having a control pressure chamber therein;
        a control pressure valve disposed in the housing and configured to substantially impede fluid flow into the control pressure chamber until the pressure of the fluid within the supply duct surpasses a minimum actuation pressure; and
        a piston slidably disposed in the housing and mechanically coupled to the main valve element, the piston normally residing in a first position corresponding to the open position of the valve element and configured to move toward a second position corresponding to the closed position of the valve element as the pressure within the control pressure chamber increases; and
    a supply duct fluidly coupled to the main flow conduit at a location downstream of the valve element and configured to direct pressurized fluid flow from the main flow conduit to the control pressure valve such that, after the minimum actuation pressure has been surpassed, pressurized fluid from the supply duct flows through the control pressure valve, into the control pressure chamber, and exerts a force on the piston urging movement of the piston toward the second position corresponding to the closed position of the valve element to maintain the pressure in the main flow conduit and downstream of the main valve element below a predetermined threshold value.

16. A flow regulation system according to claim 15 wherein the valve actuator further comprises a piston spring disposed in a return pressure chamber and biasing the piston toward the first position.

17. A flow regulation system according to claim 15 wherein the first and second positions of the piston are retracted and extended positions, respectively.

18. A flow regulation system according to claim 15 further comprising a return pressure chamber vented to a low pressure source.

19. A flow regulation system according to claim 15 wherein the valve actuator further comprises a control flow orifice fluidly coupling the control pressure chamber to a return pressure chamber.

20. A flow regulation system according to claim 19 wherein the control flow orifice is formed through the piston.

* * * * *